United States Patent Office 3,605,524
Patented Sept. 20, 1971

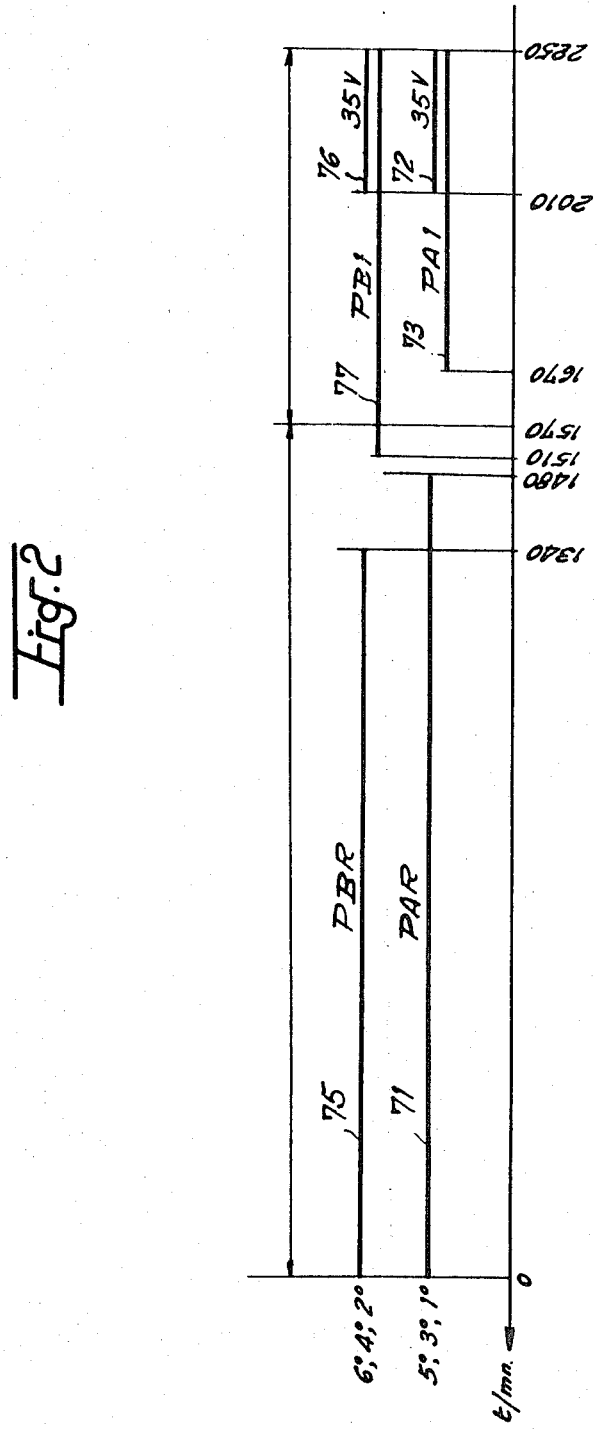

3,605,524
GEAR-BOX SYSTEM INCLUDING A TORQUE CONVERTER AND SPEED RESPONSIVE MEANS
Charles J. Debeaud, Bougival, France, assignor to Etablissements Henri J. de Tabet, Nanterre, Hauts-de-Seine, France
Filed Apr. 16, 1969, Ser. No. 816,754
Claims priority, application France, May 14, 1968, 151,686
Int. Cl. F16h *47/00*
U.S. Cl. 74—731
8 Claims

ABSTRACT OF THE DISCLOSURE

A gear-box system comprising a hydraulic torque converter followed by mechanical stages, which provide different ratios, and equipped with indicating devices responsive to the rotational velocity of the output shaft of the torque converter, one device being maintained in the active position as long as the rotational velocity of the output shaft of the torque converter is lower than a predetermined value at which the slippage of the torque converter is considered excessive and calls for downshifting of the gear-box. A second indicating device is maintained in the active position when the rotational velocity of the output shaft of the torque converter exceeds a predetermined value which is higher than the aforesaid value and at which it is desirable to change to a higher ratio of the gear-box. The inactive state of each of said two indicating devices is representative of the normal operative state of the system as a whole.

---

Figure 1:
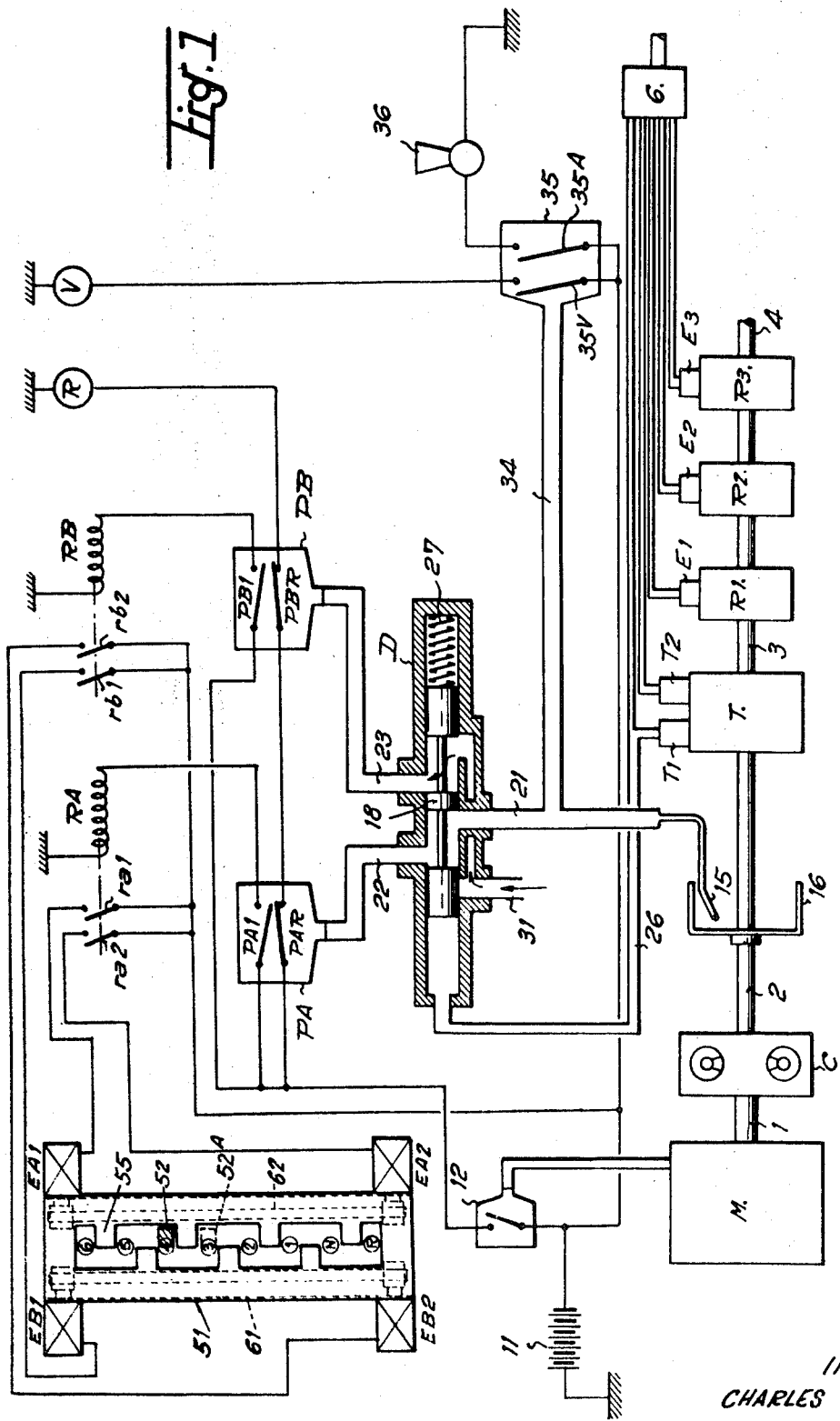

This invention relates to transmisions or gear-box systems of the type comprising a hydraulic torque converter followed by a number of mechanical stages which provide different ratios and which may consist of epicyclic gear trains, for example.

In wheeled vehicles which are equipped with gear-box systems of this type, drivers cannot rely on the speed of rotation of the engine in order to change or shift at the proper time through the different ratios provided by the gear-box. In fact, there is no positive mechanical drive between the engine and the gear-box owing to the presence of the hydraulic torque converter; the road speed of the vehicle is independent of the speed of rotation of the engine except under particular conditions of direct drive in which the hydraulic torque converter is locked out mechanically.

The aim of this invention is to provide gear-box systems of the type referred-to with an installation which is designed to provide the driver with an indication of the proper moments for changing to a lower gear-ratio or "down-shifting" as well as the proper moments at which the driver should shift to a higher gear-ratio without being obliged to rely on personal appreciation and experience for the correct operation of the gear-box.

To this end and in accordance with the invention, the gear-box system is additionally equipped with two indicating devices which are responsive to the rotational velocity of the output shaft of the torque converter, the first device being maintained in the active position as long as the rotational velocity of the output shaft of the torque converter is lower than a predetermined value at which it is considered that the slippage of the converter is excessive and calls for downshifting of the gear-box whilst the second indicating device is maintained in the active position when the rotational velocity of the output shaft of the torque converter exceeds a predetermined value which is higher than the value aforesaid and at which it is desirable to change to a higher ratio of the gear-box in order to reduce the speed at which the engine drives said gear-box, the inactive state of each of the two indicating devices being representative of the normal operative state of the system as a whole.

By virtue of this particular installation in which the indicating means can advantageously consist of devices equipped with signal lamps having two different colours, the driver is made aware of the fact that, when both signal lamps are extinguished, the gear-box is accordingly engaged in the most favourable combination whereas, if the first signal lamp lights up, this means that the rotational velocity of the output shaft of the hydraulic torque converter is too low, in which case the driver must change or shift down in order to prevent dangereous overheating of the converter oil. On the contrary, if the signal lamp of the second device lights up, this means that the output shaft of the torque converter and consequently the engine which is directly coupled to said output shaft at that time are rotating at an excessive speed and that it is therefore necessary to shift to a higher gear ratio.

In general, the installation under consideration therefore has the advantage of preventing excessive slippage of the torque converter as well as excessive engine speeds while at the same time permitting the most effective utilization of engine braking when coasting downhill under load and ensuring maximum efficiency of the system by permitting judicious selection of the most favourable gear ratio at each moment.

According to a further property of the invention, a third indicating device is designed and arranged to come into action when the speed of the output shaft of the torque converter attains the maximum speed of the engine on no load. Thus, the driver and attendant personnel will be warned by this third device in the event of excessive speed resulting from overrunning of the machine on a downhill slope.

In one advantageous form of construction, the gear-box further comprises a system for locking the gear-shift lever in order to prevent the operation of this latter for downshifting when the rotational velocity of the output shaft of the torque converter is higher than a predetermined critical value without thereby interfering with any shift to a higher gear ratio.

A better understanding of the invention will be gained from the following description and from the accompanying drawings in which one form of construction of an improved torque converter transmission or gear-box system in accordance with the invention is shown by way of non-limitative example, and in which:

FIG. 1 is a diagrammatic view of the assembly which comprises the gear-box and the indicating and locking device which is associated therewith; and FIG. 2 is a diagram of the conditions of operation of the complete system.

The transmission or gear-box which is shown very diagrammatically in FIG. 1 and driven by a motor M comprises a hydraulic torque converter C, the input shaft 1 of which is driven by the motor M, a first planetary gear train T whose input shaft is rigidly fixed to the output shaft 2 of the torque converter C and three planetary reduction gear sets R1, R2 and R3.

Two clutch units T1 and T2 are intended to provide the output shaft 3 of the first planetary gear train T selectively wth two different velocity values with respect to the rotational velociy of its input shaft 2. Three clutch units E1, E2 and E3 serve to put selectively into service the three other planetary gear trains R1, R2 and R3 in each of the two states of the first planetary gear train T, with the result that the mechanical gear-box assembly which follows the hydraulic converter T is capable of supplying six different gear ratios.

There is shown diagrammatically at 6 a hydraulic distributor for the remote operation of the clutch units of the different planetary gear trains.

In the example under consideration, the different speed conditions are summarized in the following table:

| A | B | | C | D | E, r.p.m. | F, r.p.m. |
|---|---|---|---|---|---|---|
|   | T1 | T2 |   |   |   |   |
| 6 |   | X | 0.67 | 1.49 | 1,510 | 1,340 |
| 5 | X |   | 1 | 1.35 | 1,670 | 1,480 |
| 4 |   | X | 1.35 | 1.49 | 1,510 | 1,340 |
| 3 | X |   | 2.01 | 1.34 | 1,680 | 1,490 |
| 2 |   | X | 2.68 | 1.49 | 1,510 | 1,340 |
| 1 | X |   | 4.00 |   |   |   |

In this table:

A designates the sequence number of the engaged gear of the gear-box;

B indicates by means of a cross in the corresponding column the particular clutch unit which is engaged, namely either the unit T1 or T2;

C indicates in the case of each combination the ratio of velocities of the input shaft 2 to the output shaft 4 of the mechanical gear-box;

D indicates the value of the ratio of the speed ratios of the gear-box when changing over from one combination to the next combination;

E gives the value of the maximum input velocity of the shaft 2 which permits downshifting;

F indicates the input velocity of the shaft 2 below which it is advisable to shift down.

It is observed from the above table that, in the case of the first, third and fifth gears, the clutch T1 is engaged whereas in the case of the second, fourth and sixth gears, the clutch T2 is engaged. It is also noted from column D that the ratio between the speed ratios of the gearbox assumes substantially either one or the other of two values 1.35:1 and 1.49:1, depending on which of these two clutch units is engaged.

The installation comprises a signal lamp V which is intended to indicate to the driver the moment at which it is advisable to shift to a higher gear than the gear which is in service at the moment considered, and a red signal lamp R which lights up when it is advisable to shift down; consequently, if neither of these two signal lamps lights up, the gear which is in service is the most favorable. In addition, a locking system which is generally designated by the reference 51 is put into service from the moment when the velocity of the output shaft 2 of the converter attains a predetermined value so that the gear-shift lever 52 cannot be operated in the downshifting direction but can be displaced in the direction which permits the use of a higher gear.

The signal lamps V and R as well as the locking system 51 are placed under the control of three pressostats 35, PA and PB which are subjected under certain conditions to the pressure collected by a Pitot tube 15 which is disposed tangentially in the vicinity of the cylindrical wall of a rotary drum 16 which is rigidly fixed to the output shaft 2 of the hydraulic torque converter C.

A Pitot tube of this type is already provided in conventional gear-boxes and is employed for the purpose of controlling a system of direct coupling of the shafts 1 and 2 which eliminates slippage of the hydraulic converter C.

The pressostat 35 is connected to the Pitot tube 15 by means of a pipe 34 and is provided with a first electric contact 35V for supplying the green signal lamp V from a current source 11.

The two pressostats PA and PB are connected to the Pitot tube 15 by means of a hydraulic distributor D comprising a slide-valve 18.

When the clutch T1 is engaged, the driving pressure of said clutch is transmitted to the distributor D by way of a pipe 26 and maintains the distributor slide-valve 18 in the position illustrated in which the pressure of the Pitot tube 15 is transmitted to the pressostat PA through the pipes 21 and 22. When the clutch T2 is engaged, the clutch T1 does not receive the driving pressure and the distributor slide-valve 18 is forced back by a restoring spring 27, with the result that the pressure of the Pitot tube 15 is transmitted to the pressostat PB through the pipes 21 and 23.

In order that no time-lag should occur in the control operation, the distributor D is continuously supplied with oil under the relatively low pressure of the gear-box lubrication system by way of a pipe 31. The pressure of calibration of the pressostats is distinctly higher than this pressure, with the result that the operation of said pressostats is not disturbed to any extent as a result of the constant application of the lubrication pressure to the distributor.

The signal lamp R can be supplied through two contacts PAR and PBR forming part respectively of the two pressostats PA and PB as well as through the contact of another pressostat 12 which is subjected to the pressure of the lubricating oil of the engine M so as to ensure that the installation is supplied with electric current only when the engine is running.

The pressostat 35 is provided with a second electric current 35A for supplying from the current source 11 a warning device 36 such as a sound signal device; the pressostat is so adjusted that the electric contact closes when the rotational velocity of the output shaft 2 of the torque converter and consequently of the engine M which is directly coupled to said shaft at that moment exceed a predetermined maximum safety value.

The device 51 for locking the gear shift lever 52 comprises a fixed grid 55 which has a cutout having a zigzag configuration from one end to the other and on which the following indications are marked as shown in the drawing from the bottom upwards and surrounded by a circle; reverse R, neutral N, then the first, second, third, fourth, fifth and sixth gears. In the drawing, the gear-shift lever 52 is shown in full lines in the fourth-gear position.

Two locking rods 61, 62 which are disposed parallel to the general direction of the grid 55 along the two opposite longitudinal edges of this latter are capable of displacement in parallel relation over a distance equal substantially to one-half the total width of the grid, that is to say substantially the thickness of the gear-shift lever 52. The locking rod 61 is thus capable of displacement from the position shown in the drawing to another position located slightly further to the right-hand side, in which said rod would consequently permit the gear-shift lever 52 in the position shown to change from fourth gear to fifth gear but would positively oppose any displacement of said lever to the third gear position.

The two locking rods 61 and 62 are carried respectively by the moving armatures of two electromagnets EB1, EB2 and EA1, EA2.

Both electromagnets EA1 and EA2 are supplied simultaneously through the two contacts ra1 and ra2 of a relay RA which is supplied from the source 11 through the contact of the pressostat 12 and through an additional contact PA1 of the pressostat PA.

Similarly, both electromagnets EB1 and EB2 are supplied simultaneously through the two contacts rb1 and rb2 of another relay RB which is in turn supplied with current from the source 11 through the contact of the pressostat 12 and through another contact PB1 of the pressostat PB.

The contacts PAR and PBR of the two pressostats PA and PB are normally closed and open above a predetermined pressure. The two contacts PA1 and PB2 of these two pressostats are normally-open contacts which close about a pressure which is slightly higher than the preceding.

In FIG. 2, there have been plotted as abscissae the rotational speeds of the output shaft 2 of the torque converter in revolutions per minute from 0 to 2250 which is the maximum speed of the engine. On a first horizontal line corresponding to an ordinate of first, third and fifth speed ratios of the gear-box, the horizontal straight line 71 indicates in respect of the speed range of 0 to 1480 r.p.m. that the contact PAR of the pressostat PA remains closed and consequently opens when the speed attains 1480 r.p.m. whilst the electric contact PBR of the pressostat PB always remains closed when one of these three gears is engaged inasmuch as said pressostat is not subjected to the pressure of the Pitot tube under these conditions. The red signal lamp therefore lights up between 0 and 1480 r.p.m.

Along the same horizontal line and consequently in respect of the same engaged gears of the gear-box, it is shown by means of the straight line 72 that the contact 35V of the pressostat 35 is closed when the speed of the shaft 2 is between 2010 and 2250 r.p.m. Under these conditions the green signal lamp therefore lights up when the speed of the shaft 2 is between 2010 and 2250 r.p.m. and no signal lamp lights up when the speed is between 1480 and 2010 r.p.m.

Again in the case in which one of the three abovementioned gears of the gear-box is engaged, the straight line 73 is shown to extend between the speeds 1670 and 2250 r.p.m.; during this range of speeds, the contact PA1 of the pressostat PA is closed and energizes the relay RA, the contacts ra1 and ra2 of which close and serve to supply the electromagnets EA1 and EA2 for displacing the locking rod 62 towards the left-hand side in FIG. 1 so that downshifting cannot be carried out within this speed range, as will become apparent hereinafter.

Similarly, there is plotted as ordinates on a second horizontal line 75 corresponding to the second, fourth and sixth gears of the box the range of 0 to 1340 r.p.m. in which the contact PBR of the pressostat PB remains closed and ensures the supply of the red signal lamp R by means of the contact PAR of the pressostat PA which has remained closed inasmuch as said pressostat is not subjected to the pressure of the Pitot tube 15 when one of the aforesaid three gears is engaged. In the case of the same speeds. the straight line 76 indicates the speed range 2010 to 2250 r.p.m. at which the green signal lamp V lights up as a result of closure of the contact 35V of the pressostat 35 and the straight line 77 indicates the speed range of 1510 to 2250 r.p.m. between which the other locking rod 61 is displaced to the active position by means of the electromagnets EB1 and EB2 which are energized in this case through the closed contacts rb1 and rb2 of the relay RB which is in turn supplied through the contact PB1 of the pressostat PB in order that the driver should be positively prevented from shifting to a lower gear ratio when the speed of the shaft 2 is within the range of 1510 to 2250 r.p.m. in second, fourth or sixth gears.

Finally, there is also indicated the speed of 1570 r.p.m. at which the direct coupling of the two input and output shafts 1 and 2 of the hydraulic converter is carried out automatically.

The indications recorded in the table of FIG. 2 correspond to a sequence of lighting of the signal lamps, to the initial operation of the system for locking the gear-shift lever and to the automatic direct coupling in the case of decreasing speeds. In the direction of increasing speeds, the values of the characteristic speeds differ only to a slight extent from those which have been given in the foregoing in respect of decreasing speeds and the principle of the system considered as a whole remains exactly the same.

The operation of the system is as follows:

When the gear-box is in a combination of first, third or fifth gears, for example in third gear as shown in broken lines by the position 52A of the gear-shift lever and if neither the red signal lamp R nor the green signal lamp V lights up, this is accordingly explained by the fact that the case, for example, of decreasing speeds, the speed of the shaft 2 is comprised between 1480 and 2010 r.p.m. and the gear ratio which is in use is consequently the most favorable.

If the green signal lamp V lights up, this means that the pressure within the Pitot tube 15 is sufficient to cause the contact 35V of the pressostat 35 to close and that the speed of the shaft 2 is comprised between 2010 and 2250 r.p.m., in which case it would be advisable to shift to a higher speed. It will be noted that this operation is not hindered by the locking system by reason of the fact that although the relay RA is energized as indicated by the straight line 73 in FIG. 2, and that the two electromagnets EA1 and EA2 therefore displace the locking rod 62 towards the left, the gear-shift lever 51A can be lifted from position 3 to position 4 which is located immediately above. Conversely, the grid would not have permitted downshifting from third to second gear.

If the red signal lamp R lights up, this means that the speed of the shaft 2 is too low inasmuch as it is lower than 1480 r.p.m. and consequently that there is excessive slippage of the hydraulic converter. It is therefore necessary to shift down and this is possible by reason of the fact that, when the speed is lower than 1480 r.p.m. and therefore all the more so when the speed is lower than 1670 r.p.m., the pressostat PA is not actuated and the locking rod 62 is not placed in the active position, said locking rod is therefore located in the position shown in the drawings and permits the gear-shift lever 52A to be moved down from the third-gear position illustrated to the second-gear position which is located immediately below.

A similar reasoning could be adopted if the second, fourth or sixth gear of the box was engaged. Referring to the graph of FIG. 2, it is apparent that neither of the two signal lamps lights up between 1340 r.p.m. and 2010 r.p.m. and that the gear engaged is consequently favorable whereas, above 2010 r.p.m., the green signal lamp V lights up and indicates the need to change to a higher speed ratio and that, on the contrary, if the red signal lamp R lights up, the speed is accordingly lower than 1340 r.p.m. and that it is advisable to shift down, which is possible since the locking rod 61 has remained in the inactive position whereas, between 1510 and 2250 r.p.m., it would have been in the active position.

The graph of FIG. 2 shows that the normal range of speeds of the output shaft 2 of the converter, namely 1480 to 2010 r.p.m. in first, third and fifth gears has values which are slightly higher than those of the normal range of 1340 to 2010 r.p.m. of the speeds of said shaft in second, fourth or sixth gear inasmuch as, by downshifting from one of the first gears mentioned above, the ratio of the new gear with respect to that which is engaged is smaller than the ratio of the engaged gear with respect to the preceding, that is under normal conditions of operation when the gear has been changed.

As will be readily understood, the invention is not limited to the form of construction which has been described in the foregoing by way of example and any number of modifications can accordingly be contemplated without thereby departing either from the scope or the spirit of the invention.

What I claim is:

1. A gear-box of the type comprising a hydraulic torque converter followed by a plurality of mechanical stages which provide different ratios and which may consist of epicyclic gear trains, characterized in that said gear-box is additionally equipped with two indicating devices which are responsive to the rotational speed of the output shaft of the torque converter, the first device being maintained in the active position as long as the rotational speed of the output shaft of the torque converter is lower than a predetermined value at which it is considered that the slippage of the converter is excessive and calls for downshifting of the gear-box whilst the second indicating device is maintained in the active position when the speed of the output shaft of the torque converter exceeds a predetermined value which is higher than the value aforesaid and at which it is desirable to change to a higher ratio of the gear-box in order to reduce the speed at which the engine drives said gear-box, the inactive state of each of the two indicating devices being representative of the normal operative state of the system as a whole.

2. A gear-box in accordance with claim 1, characterized in that a third indicating device is designed and arranged to come into action when the speed of the output shaft of the hydraulic torque converter attains the maximum speed of the engine on no load.

3. A gear-box in accordance with claim 1, characterized in that the indicating devices are placed under the control of pressostats connected to a Pitot tube which is subjected to the action of the rotational speed of a plate which is rigidly fixed to the output shaft of the hydraulic torque converter.

4. A gear-box in accordance with claim 1, characterized in that when the ratios of the successive speed ratios of the gear-box are different, the first and second indicating devices are placed in the active position in the case of speeds of the output shaft of the torque converter which are slightly lower when the gear-box provides a speed ratio at which downshifting to the lower stage would produce speed ratios higher than that which would result from shifting to the stage immediately above and conversely, the first and second indicating devices are set in the active position in respect of speeds of the output shaft of the converter which are slightly higher when the gear box provides a speed ratio at which downshifting to the lower stage would produce speed ratios lower than that which would result from shifting to the stage of speeds immediately above.

5. A gear-box in accordance with claim 1, characterized in that said gear-box further comprises a system for locking the gear-shifting lever which is intended to prevent downshifting by means of said lever when the speed of the output shaft of the torque converter is higher than a predetermined critical value without thereby preventing any change to a higher gear.

6. A gear-box in accordance with claim 5, characterized in that the gear-shift lever is engaged in a grid having a zigzag configuration and provided with two lateral longitudinal rods which are displaced transversely towards said grid and selectively in the case of a gear of odd-number sequence in response to actuation of a device for detecting the aforesaid critical speed.

7. A gear-box in accordance with claim 4, characterized in that, when said gear-box is equipped with a neutralizable intermediate speed reduction stage between the output of the torque converter and the mechanical stages aforesaid and when the ratios of the gear-box speed ratios are proximate either to a first predetermined value or to a second predetermined value depending on whether the intermediate speed reduction stage is put into service or not, the first indicating device and the locking device are placed under the control of two pressostats which are put into service selectively according as the speed reduction stage is in turn put into service or not.

8. A gear-box in accordance with claim 1, characterized in that the indicating devices are electrically operated and therefore supplied with current by means of a pressure contact which is responsive to the pressure of the lubricating oil of the engine which drives the gear-box.

References Cited
UNITED STATES PATENTS

| | | | |
|---|---|---|---|
| 3,250,142 | 5/1966 | Schuster et al. | 74—336.5 |
| 3,296,607 | 1/1967 | Pasinski | 340—263 |
| 3,420,328 | 1/1969 | Johnson et al. | 74—731 |
| 3,487,725 | 1/1970 | Brunot | 74—752A |

CORNELIUS J. HUSAR, Primary Examiner

U.S. Cl. X.R.

340—52; 180—106